Sept. 12, 1961 H. S. STERN 2,999,593
CLASSIFICATION OF MATERIALS

Filed Nov. 4, 1957 3 Sheets-Sheet 1

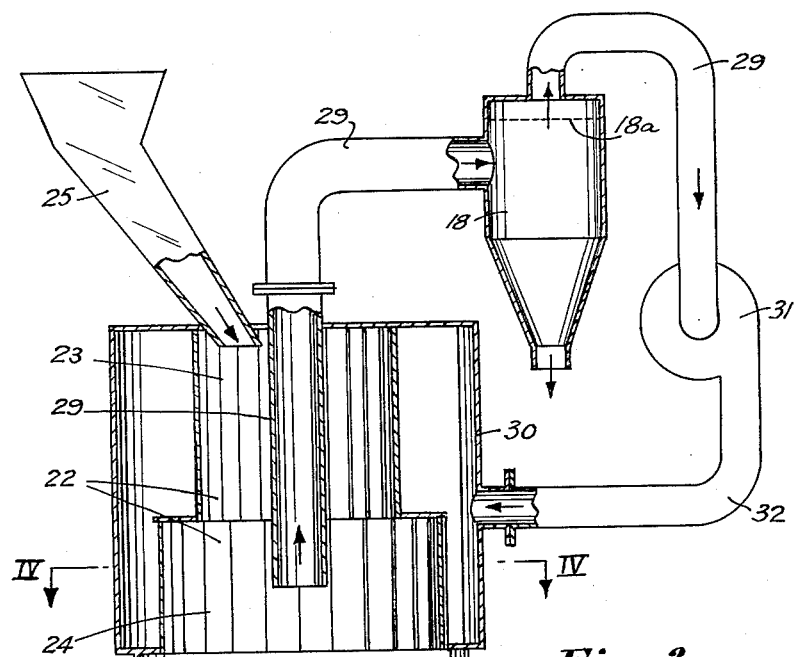
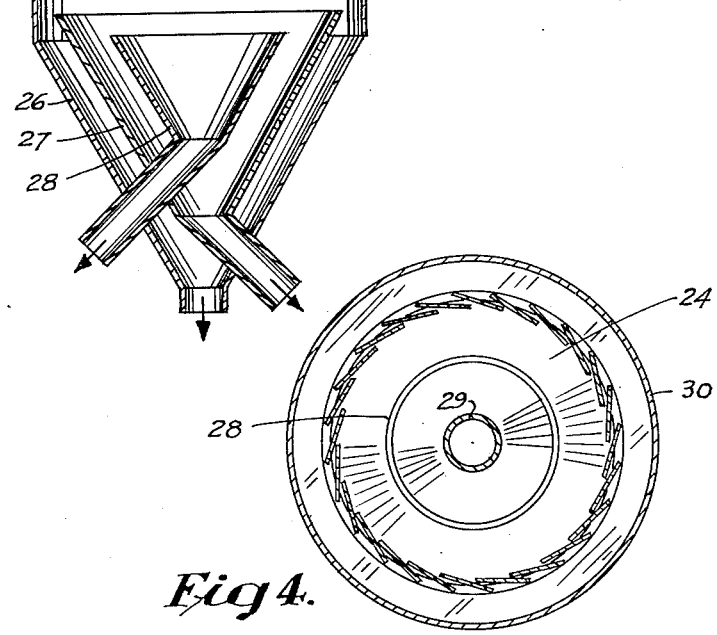

United States Patent Office
2,999,593
Patented Sept. 12, 1961

2,999,593
CLASSIFICATION OF MATERIALS
Hans Stern, 17 Morris Crescent, Springs, Transvaal,
Union of South Africa
Filed Nov. 4, 1957, Ser. No. 694,418
Claims priority, application Union of South Africa
Nov. 12, 1956
6 Claims. (Cl. 209—144)

This invention relates to the classification of materials in accordance with their physical properties of size, shape and specific gravity. It embraces within its scope the air separation of solid materials in accordance with particle size, shape or specific gravity and also the classification of solids or liquids carried in a fluid medium. As examples of the solid materials to which the invention is applicable may be mentioned mineral dusts, fibrous substances and granular materials.

The invention further embraces within its scope the breaking down of agglomerations of particles of materials into their fractions.

According to the invention there is provided apparatus for the classification of materials or for the breaking down of agglomerations of particles into their fractions comprising an elongated whirl chamber of circular cross-section having at or near one end an inlet for unclassified or agglomerated raw material as the case may be, the peripheral wall of the chamber being so constructed that a fluid may be introduced tangentially thereinto at a plurality of points or zones distributed around the full periphery and extending substantially along the length thereof; and in the classification of materials, a plurality of concentric ducts co-axial with the longitudinal axis of the chamber for selectively receiving the fractions, there being in the transverse zone containing the inner ends of the ducts no material impediment to the fluid flow in an axial direction from the inlet to the chamber towards the ducts; or, in the case of breaking down agglomerations, means for receiving the fractions.

Insofar as it concerns the classification of materials, the mouth or mouths of the duct or ducts adjacent the outlet end of the chamber may project into the chamber or they may be spaced longitudinally therefrom.

The peripheral wall of the chamber may have a plurality of parallel longitudinal slats spaced from each other to provide openings which permit tangential entry of the said fluid stream.

In accordance with still another feature of the invention, the chamber may be surrounded by a sleeve member or jacket having one or more inlets through which the fluid stream may enter.

The fluid stream referred to will normally be an air stream. It is, however, within the scope of the invention to use a liquid stream.

In order that the nature of the invention may be fully understood, practical embodiments thereof will now be described, purely by way of example, as applied to apparatus for the separation of mineral dust into different fractions, with reference to the accompanying drawings, in which—

FIGURE 3 is a sectional elevation of a vertical classifier.

FIGURE 4 is a section on line IV—IV in FIGURE 3.

Figure 1:
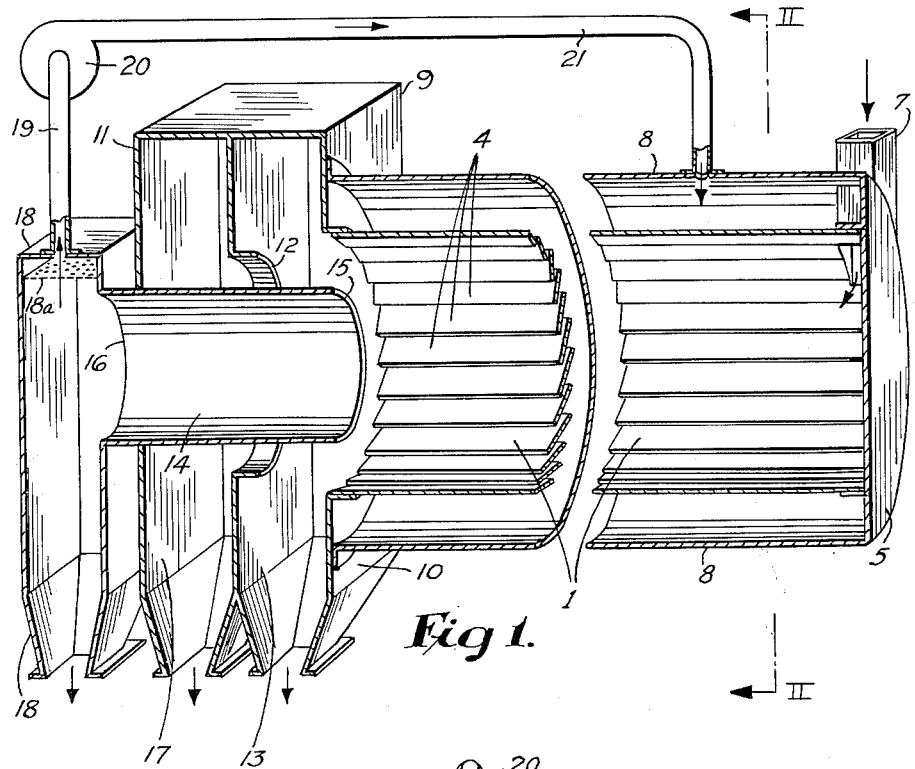
FIGURE 1 is a sectional perspective view of a horizontal classifier.
Figure 2:
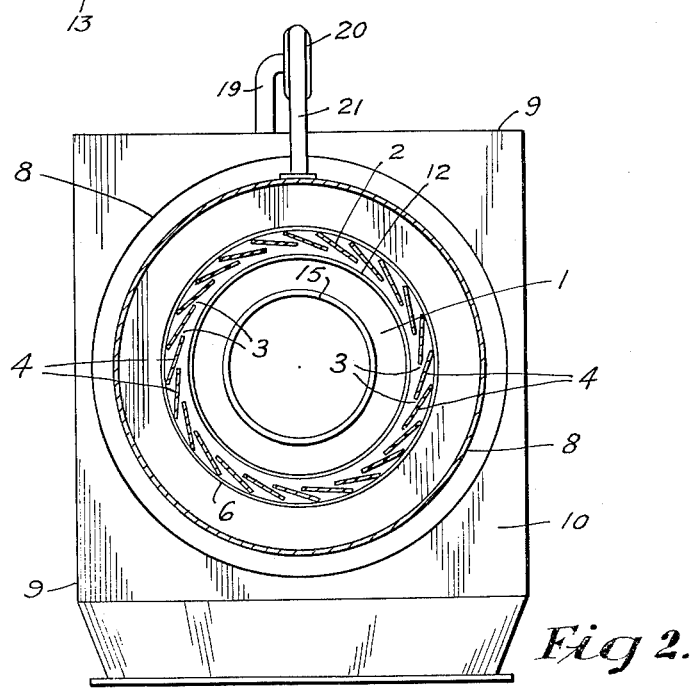
FIGURE 2 is a section on the line II—II in FIGURE 1.
Figure 5:
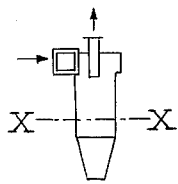
FIGURE 5 is a diagrammatic representation of a conventional cyclone embodying cyclonic flow.

With reference to FIGURES 1 and 2, the apparatus comprises a materially horizontal cylindrical separation or whirl chamber 1. The peripheral wall 2 consists of a plurality of parallel, longitudinal slats 4, evenly spaced from each other to provide openings 3 which permit tangential entry of an air stream into whirl chamber 1. The openings 3 are distributed around the full periphery and extend substantially along the length of whirl chamber 1. As can be seen from FIGURE 2, openings 3 are nozzle-like in shape with the openings narrowing towards the interior of whirl chamber 1. The slats 4 are mounted at their ends on end wall 5 and support ring 6.

The one end of whirl chamber 1 is closed by end wall 5 and adjacent this end there is provided inlet 7 through which unclassified raw material may pass tangentially thereinto. Whirl chamber 1 is further surrounded by tubular jacket or sleeve member 8 having an inlet through which the air stream may enter.

The other end of whirl chamber 1 is open and is connected to the interior of vertical collecting chamber 9 for the coarse fraction, operating on the cyclonic principle, through an aperture in wall 10 thereof. A second vertical collecting chamber 11 for the medium fraction and which also operates on the cyclonic principle, is connected to collecting chamber 9 through a cyclindrical duct 12. Duct 12 is of smaller diameter than that of whirl chamber 1 and is mounted co-axially therewith on the dividing wall 13 so that its mouth projects a short distance into collecting chamber 9, but is spaced longitudinally from the whirl chamber 1. A cylindrical duct 14 of smaller diameter than that of duct 12 extends transversely across both collecting chambers 9 and 11 through duct 12. Duct 14 is located co-axially with respect to duct 12 and to the whirl chamber 1. The inner end 15 of duct 14 just enters the whirl chamber 1 and its opposite end 16 extends through wall 17 of collecting chamber 11 to collecting means 18 for the fine fraction.

Pipe line 19 connects collecting means 18 to fan 20 which in turn is connected to the inlet jacket 8 via pipe line 21.

In operation, an air stream is introduced tangentially and at high velocity through openings 3 into whirl chamber 1 from jacket 8 by means of fan 20, the tangential velocity of the air stream entering whirl chamber 1 being higher than that which would be obtained with conventional cyclinic flow in a chamber of the same dimensions handling the same total quantities of air. The high tangential velocity of the air stream imparts a whirling motion to the raw material, at the same time, inter alia, breaking down agglomerations of particles into their fractions.

The fractions of the raw material are isolated and accumulated according to their varying physical properties into different and concentric zones. A coarse fraction is contained in an outer annular zone in whirl chamber 1 from whence it passes into collecting chamber 9 to be trapped therein and subsequentially withdrawn. A medium fraction is contained in a central annular zone in whirl chamber 1 from whence it passes transversely across collecting chamber 9 to be selectively received by duct 12 and collected in collecting chamber 11 from whence it can be subsequently withdrawn. A fine fraction is contained in an inner annular zone in the whirl chamber 1 from whence it passes to be selectively received by duct 14 and conveyed to collecting means 18.

Purified air is withdrawn from collecting means 18 and recirculated into jacket 8.

Whirl chamber 1 may be also of frusto-conical shape with the narrow end disposed towards either the inlet 7 or collecting chamber 9. Although regularly spaced openings 3 will produce the best results, it is possible to space the openings irregularly around the periphery of whirl chamber 1.

Instead of forming the peripheral wall 2 of the whirl chamber 1 with vanes or slats 4 spaced so as to provide openings 3 to permit tangential entry of the air stream, the peripheral wall 2 may be provided with a plurality of holes drilled tangentially therethrough to produce the same effect.

Tangential entry of the unclassified raw material into whirl chamber 1 through inlet 7 assists the whirling action, but the tangential velocity of the air stream is sufficiently high to permit any other direction of entry, such as for example, radial. It will be appreciated that the unclassified raw material may be introduced into the whirl chamber 1 on its own, or may be carried thereinto by a fluid medium.

With the closed air circuit described above, the air stream introduced into jacket 8 may be controlled by means of fan 20. One or more valve controlled inlets may be provided for jacket 8. Where a closed air circuis is not employed, the air stream may be introduced into the whirl chamber 1 by either induced or forced draught. It will be appreciated that the apparatus may be used without jacket 8.

It is not essential for duct 14 to extend right across collecting chambers 9 and 11 into whirl chamber 1, but may extend only a short distance into collecting chamber 11 so that its mouth is spaced longitudinally from the whirl chamber 1. The actual classification of the fractions which will be obtained will depend on the relative diameters of ducts 12 and 14 and of whirl chamber 1. By arranging further co-axial ducts of different diameters adjacent the outlet end of whirl chamber 1, more than three fractions may be collected, the actual classification again depending on the relative diameters of the collecting ducts.

Collecting means 18 may comprise a cyclonic collector or may be provided with a filter element 18a for separating the fine fraction from the air stream. A filter bag operating on the vocuum cleaner principle may be used.

As shown in FIGURES 3 and 4 the vertical classifier is provided with a substantially vertical whirl chamber 22 which is divided into co-axial cylindrical upper and lower portions 23 and 24 respectively of different diameters. Upper portion 23 forms a primary whirl chamber which enhances the break-down of agglomerations of particles due to its smaller diameter. Lower portion 24 forms a secondary whirl chamber. The unclassified raw material is introduced axially into whirl chamber 22 through inlet 25.

The fractions of raw material are again isolated and accumulated into different and concentric zones in whirl chamber 22, the coarse fraction being contained in an outer annular zone, the medium fraction in a central annular zone, and the fine fraction in an inner annular zone. The fractions pass downwardly and are selectively received by ducts 26, 27 and 28 of frustro-conical shape which are each co-axially located with respect to whirl chamber 22. The coarse fraction will be received by outer duct 26, the medium fraction by central duct 27 and the fine fraction by inner duct 28. The actual classification achieved will depend on the relative diameters of the mouths of ducts 26, 27 and 28.

A cylindrical outlet duct 29 which is located co-axially with respect to whirl chamber 2, extends longitudinally from the top through upper portion 23 and into lower portion 24 so that the mouth of duct 29 is spaced longitudinally from the outlet end of chamber 22. The air stream is withdrawn through outlet duct 29 and is recirculated into jacket 30 by fan 31 via pipe line 32. It is possible for an ultra-fine fraction which is contained in an innermost annular zone, to pass into outlet duct 29 and be withdrawn with the air stream. This ultra-fine fraction may be separated from the air stream, as in the case of the horizontal classifier, in collecting means 18 provided in outlet duct 29.

As mentioned above, the tangential velocity of the air stream in a whirl chamber according to the invention is higher than that which would be obtained with conventional cyclonic flow in a chamber of the same dimensions handling the same total quantities of air. The higher tangential velocity is obtained as a result of the fact that the flow within the whirl chamber is a combination of conventional cyclonic flow having a component in an axial as well as in a transverse tangential direction, and of pure jet flow having a transverse tangential component only. The pure jet flow is obtained by virtue of introducing the air stream tangentially into the whirl chamber at points or zones distributed around the full periphery and extending substantially along the length thereof.

Figure 6:
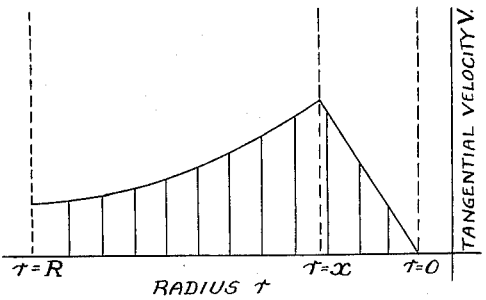
FIGURE 6 is a flow diagram showing the flow pattern in the plane X—X in FIGURE 5.

In FIGURE 6 the tangential velocity V obtained in a conventional cyclone embodying cyclonic flow only, is plotted against the radius r measured from the longitudinal axis of the cyclone. The tangential velocity of the air stream has a certain definite value at the peripheral wall of the cyclone where $r=R$, and increases towards the axis until a maximum value is reached at $r=x$, the velocity varying with the radius according to the equation $Vr^n=$Constant. The velocity decreases rapidly from maximum value at $r=x$, to zero at $r=0$, which coincides with the longitudinal axis of the cyclone, the velocity decreasing with radius according to the equation $$\frac{V}{r} = \text{Constant}$$

The radius $r=x$ is roughly the same as the radius of the outlet duct from the cyclone.

Figure 7:
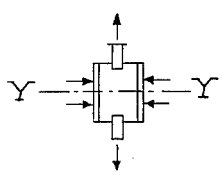
FIGURE 7 is a diagrammatic representation of a separation chamber embodying pure jet flow.
Figure 8:
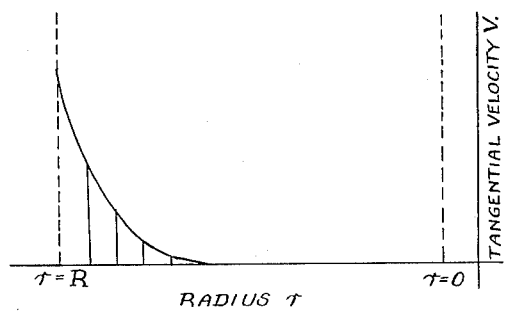
FIGURE 8 is a flow diagram showing the flow pattern in the plane Y—Y in FIGURE 7.
Figure 9:
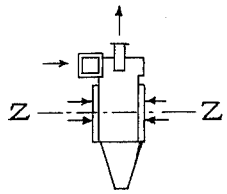
FIGURE 9 is a diagrammatic representation of a separation chamber embodying combined cyclonic and jet flow.

FIGURE 7 represents diagrammatically a whirl chamber embodying pure jet flow, and in order to eliminate the component of normal cyclonic flow, the chamber is provided with an outlet at each end, and the plane Y—Y is taken coincident with the transverse centre line. The plot in FIGURE 8 of tangential velocity V against radius r measured from the longitudinal axis of the whirl chamber, shows the flow pattern in the plane Y—Y. The tangential velocity at the peripheral wall of the whirl chamber where $r=R$, is much higher than that obtained with conventional cyclonic flow (see FIGURE 6), but the velocity diminishes rapidly towards zero.

Figure 10:
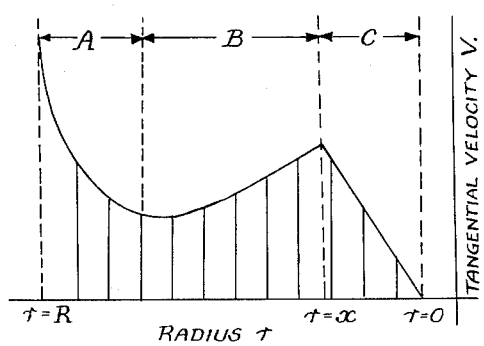
FIGURE 10 is a flow diagram showing the flow pattern in the plane Z—Z in FIGURE 9.

The flow pattern obtained with combined cyclonic and jet flow in whirl chambers according to the invention is shown in the plot in FIGURE 10. The whirl chamber may be considered as being divided into three concentric operational regions A, B and C. Annular region A is located adjacent to the peripheral wall of the chamber and may be described as a scouring region in which agglomerations of particles are broken down. The coarsest material will be found in this region, and particularly on the border between regions A and B. Region B is a central annular region in which the actual classification of the fractions of the raw material takes place, according to their varying physical properties, and in which the fractions are isolated into different and concentric zones. The coarsest fraction is contained in an outer annular zone of region B and the fractions become progressively finer towards an inner annular zone until the finest fraction is found on the border between regions B and C.

The fractions present in inner annular region C are not subject to classification, but will be withdrawn with the air stream through the outlet duct. These fractions may be collected in separate collecting means. The radius of region C is roughly the same as the radius of the air outlet duct from the whirl chamber.

As mentioned above, agglomerations of particles of materials are broken down into their fractions in whirl chambers according to the invention. Where agglomerated materials are required to be broken down into their fractions, but classification of these fractions is not required, the method and apparatus according to the invention may be adapted for that purpose. The co-axial ducts for selectively receiving the fractions may be dispensed with and means provided adjacent the outlet end of the whirl chamber for collecting all the separated fractions in an unclassified condition.

In the case of the horizontal method, a single collecting chamber, such as chamber 9, may be provided for collecting all the fractions emerging from whirl chamber 1 (see FIGURE 1). In the case of the vertical method, a single collecting duct, such as outer duct 26, may be provided for collecting all the fractions emerging from whirl chamber 22 (see FIGURE 3).

I claim:
1. Apparatus for the classification of materials and for the breaking down of agglomerations of particles into separate fractions of varying respective physical properties comprising an elongated whirl chamber of circular cross section having a longitudinal axis of substantial length relative to said cross section and having a plurality of entrant apertures distributed around the entire periphery and extending substantially along the length thereof, said entrant apertures being closely spaced and tangentially disposed to permit tangential entry of a practically undivided fluid stream of peripherally uniform pressure into the whirl chamber which is closed at one end by an end wall and completely open at the other end to provide a discharge outlet; draft inducing means introducing air into the whirl chamber through such entrant apertures; an inlet for raw materials being provided towards the closed end of said whirl chamber and receiving means at the other end of the whirl chamber for receiving the fractions, there being no material impediment to fluid flow in an axial direction from the whirl chamber into the receiving means.

2. Apparatus according to claim 1 in which the whirl chamber includes a peripheral wall which consists of parallel longitudinal slats spaced from each other to provide the entrant apertures which permit tangential entry of the fluid stream.

3. Apparatus according to claim 1 in which said receiving means includes a plurality of ducts concentric with said chamber for receiving predetermined fractions from concentric zones into which the material fractions have been isolated and accumulated.

4. Apparatus according to claim 3 in which the concentric ducts are coaxial with the longitudinal axis of the whirl chamber for selectively receiving the fractions in inner concentric zones into which fractions of varying physical properties are isolated and accumulated, the inner ends of the ducts projecting into the whirl chamber.

5. Apparatus according to claim 3 in which the concentric ducts are coaxial with the longitudinal axis of the whirl chamber for selectively receiving the fractions in inner concentric zones into which fractions of varying physical properties are isolated and accumulated, the inner ends of the ducts adjacent the open end of the whirl chamber being spaced longitudinally therefrom.

6. Apparatus as claimed in claim 1 comprising a sleeve member surrounding the whirl chamber having at least one inlet through which the fluid stream may enter.

References Cited in the file of this patent

UNITED STATES PATENTS

| | | |
|---|---|---|
| 1,470,531 | Hokanson | Oct. 9, 1923 |
| 1,897,195 | Howden | Feb. 14, 1933 |
| 2,846,151 | Wehn | Aug. 5, 1958 |

FOREIGN PATENTS

| | | |
|---|---|---|
| 174,051 | Austria | Feb. 23, 1953 |
| 519,103 | Canada | Dec. 6, 1955 |
| 745,804 | Great Britain | Feb. 29, 1956 |